United States Patent [19]
Warner

[11] Patent Number: 5,313,724
[45] Date of Patent: May 24, 1994

[54] PICTURE FRAME ILLUMINATION APPARATUS

[76] Inventor: Sheila J. Warner, 323 Nordina St., Redlands, Calif. 92373

[21] Appl. No.: 729,322

[22] Filed: Jul. 12, 1991

[51] Int. Cl.$^5$ .............................................. G09F 13/18
[52] U.S. Cl. ................................... 40/152.2; 362/223
[58] Field of Search .............. 362/255, 223, 287, 812; 40/152.2, 546

[56]  References Cited
U.S. PATENT DOCUMENTS

| | | | |
|---|---|---|---|
| 2,269,819 | 1/1942 | Isenberg | 362/255 X |
| 2,524,657 | 10/1950 | Ford | 40/546 |
| 3,067,352 | 12/1962 | Vodicka et al. | 362/255 X |
| 3,318,032 | 5/1967 | Robison et al. | 40/152.2 |
| 3,742,203 | 6/1973 | Noe | 40/152.2 X |
| 4,432,044 | 2/1984 | Lautzenheiser | 362/223 |
| 5,016,143 | 5/1991 | Aikens | 362/287 X |

Primary Examiner—Kenneth J. Dorner
Assistant Examiner—J. Bonifanti
Attorney, Agent, or Firm—Leon Gilden

[57] ABSTRACT

A picture frame is formed in a perimeter relationship relative to a central support plate. The picture frame includes a housing coextensively directed about the support plate, with the housing including a housing section associated with each side of the support plate. Each housing section includes an elongate cylindrical illumination bulb mounted therewithin. A transparent lens is positioned contiguous to and adjacent each edge of the central support plate coextensive with each illumination bulb to direct illumination onto the central support plate. A modification of the invention includes each elongate bulb formed with a plurality of semi-cylindrical coatings, including an opaque, translucent, and clear coating to provide a varying degree of illumination directed upon the central support plate.

1 Claim, 5 Drawing Sheets

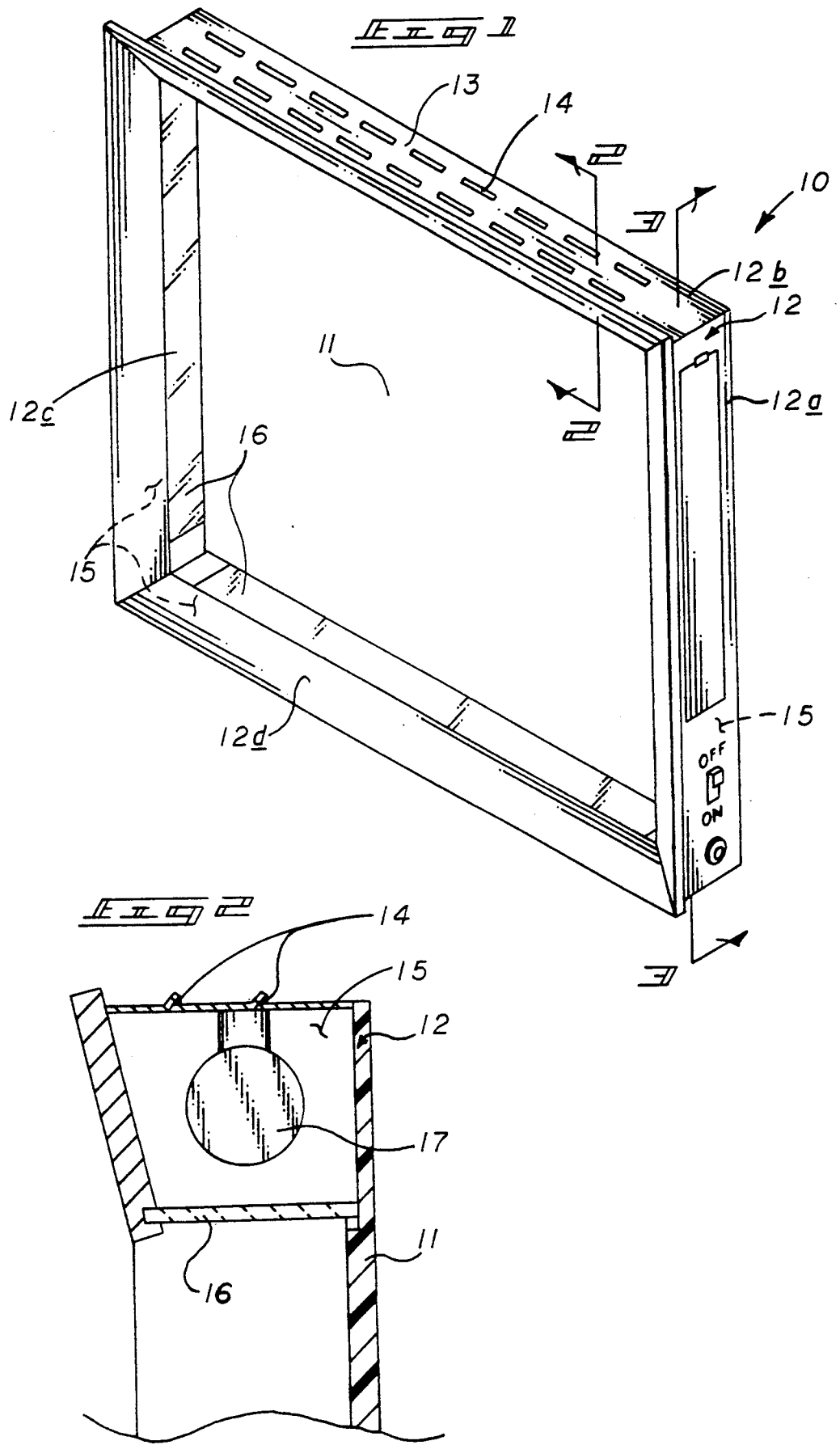

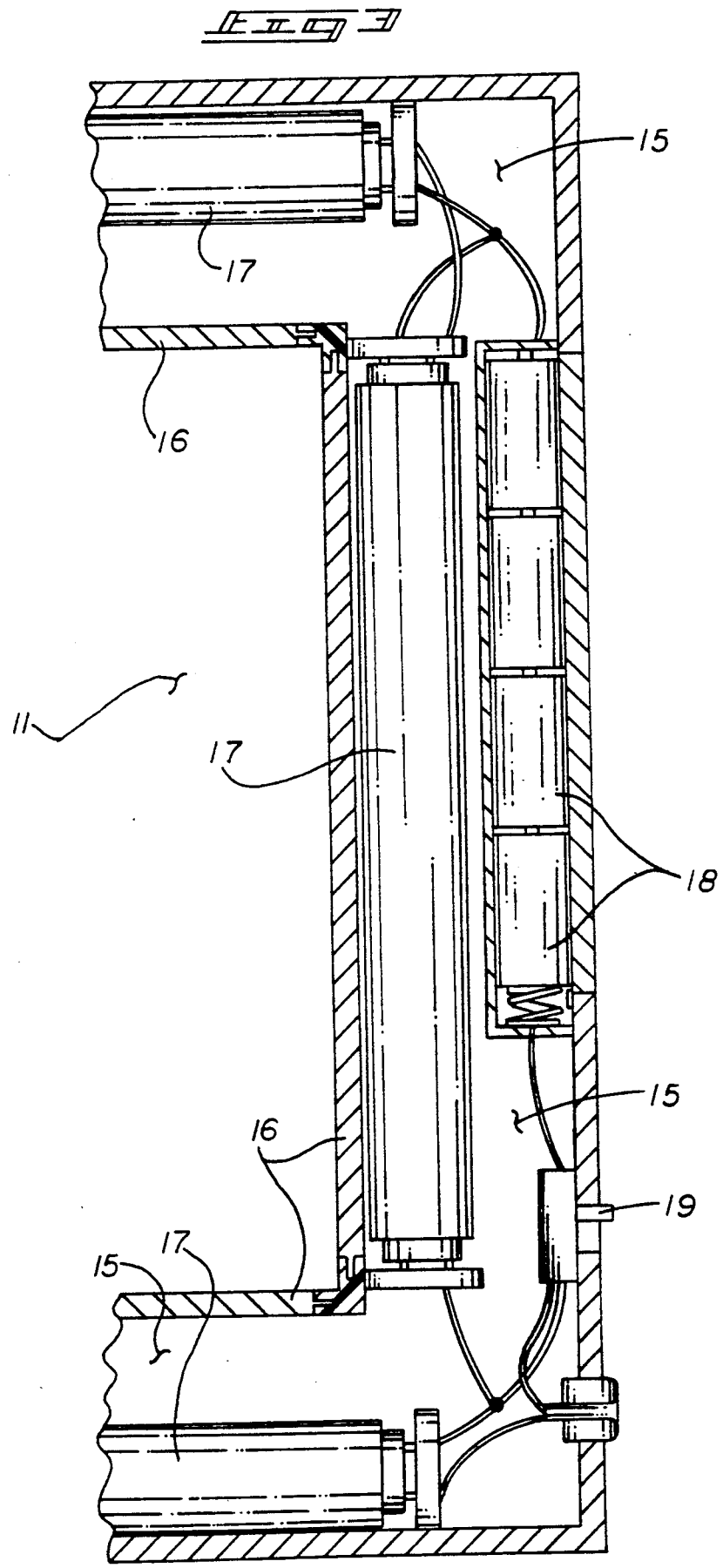

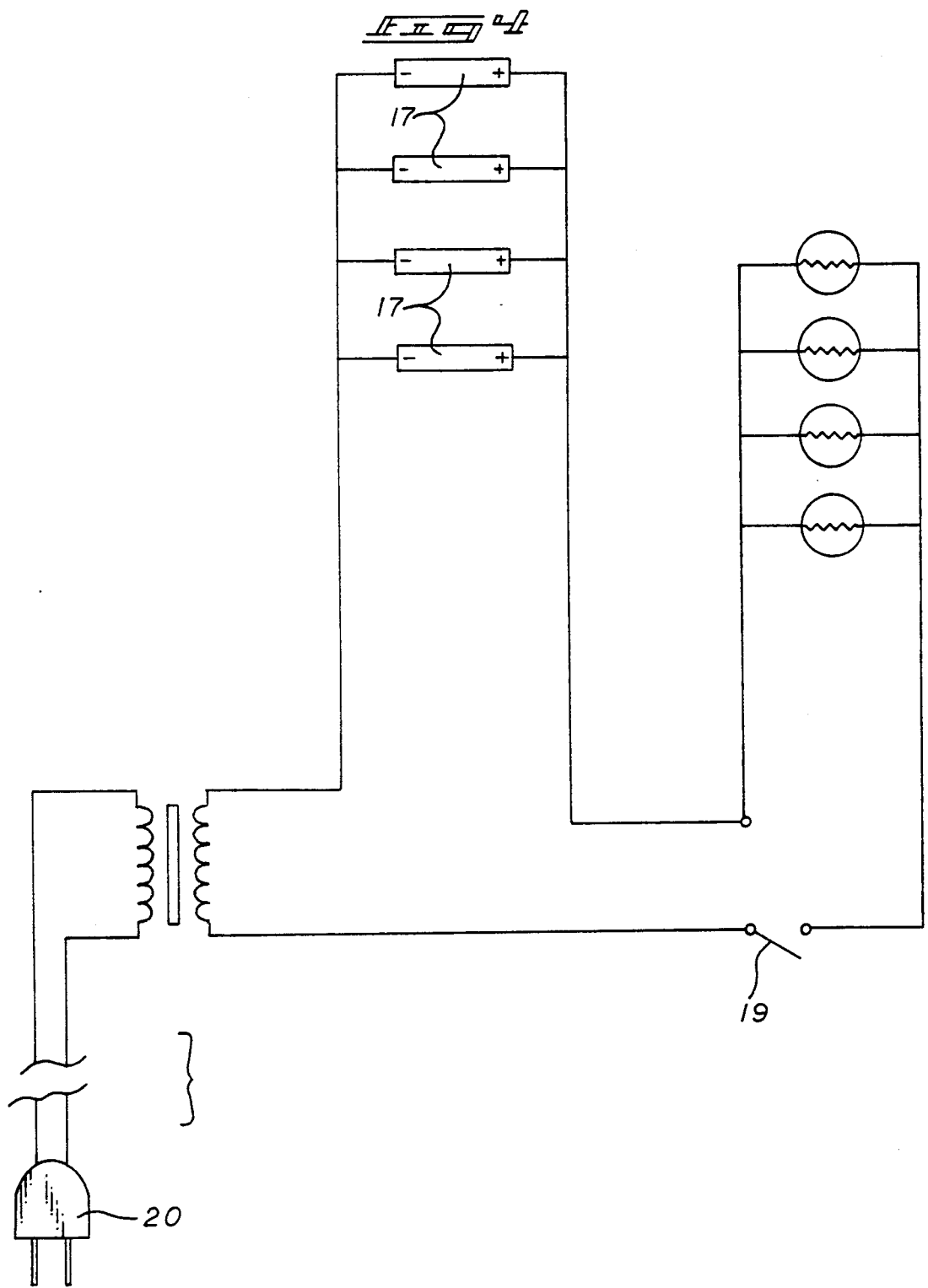

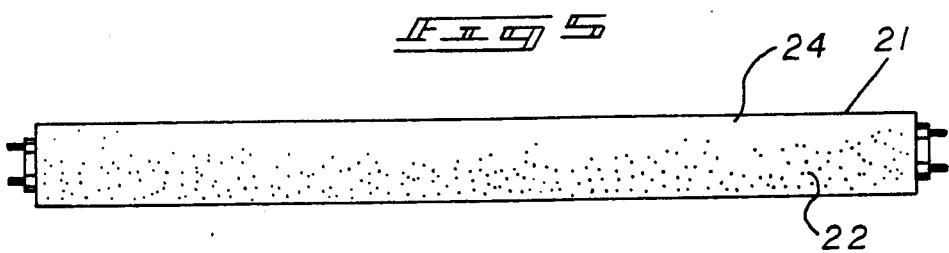
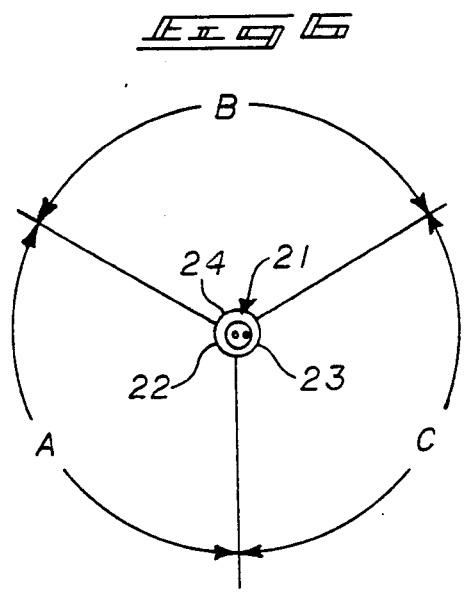
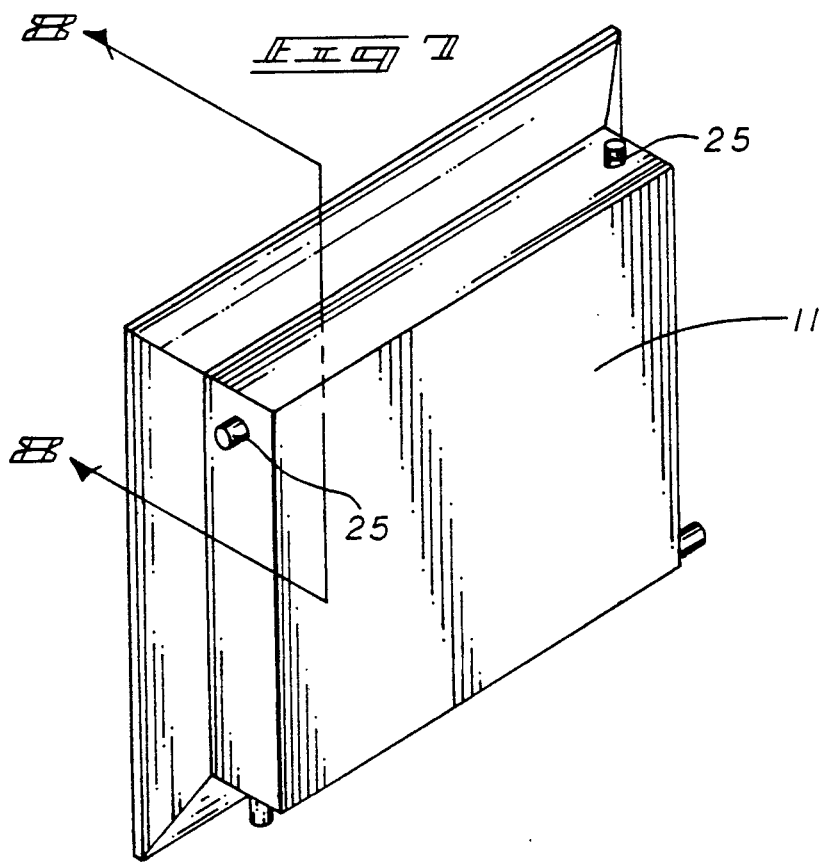

PICTURE FRAME ILLUMINATION APPARATUS

BACKGROUND OF THE INVENTION

1. Field of the Invention

The field of invention relates to picture support apparatus, and more particularly pertains to a new and improved picture frame illumination apparatus wherein the same projects illumination onto a central picture mounting support plate.

2. Description of the Prior Art

Illumination apparatus in the prior art has typically utilized a bulb member positioned above or below an associated picture to direct illumination thereon. The instant invention attempts to overcome deficiencies of the prior art by providing illumination onto the central support plate of the picture frame from each side thereof from an associated housing. Prior art illumination apparatus includes U.S. Pat. No. 4,282,669 to Rieumont wherein a picture frame includes illumination positioned above and below the picture frame directing illumination between vertical slats.

U.S. Pat. No. 4,819,353 to Jlucksman, et al. sets forth an illuminated picture frame wherein the same utilizes a plurality of bulbs mounted to each side of the picture frame to project illumination thereon.

U.S. Pat. No. 4,697,365 to Moosbrugger, et al. sets forth an illumination housing directing illumination from above and below a central support plate.

U.S. Pat. No. 4,674,211 to Pratt sets forth a picture frame structure mounting illumination bulbs about a central support plate to each side thereof.

As such, it may be appreciated that there continues to be a need for a new and improved picture frame illumination apparatus as set forth by the instant invention which addresses both the problems of ease of use as well as effectiveness in construction in directing illumination from each side of a picture frame and in this respect, the present invention substantially fulfills this need.

SUMMARY OF THE INVENTION

In view of the foregoing disadvantages inherent in the known types of picture frame illumination apparatus now present in the prior art, the present invention provides a picture frame illumination apparatus wherein the same is arranged to project varying intensity of illumination onto a central picture from a plurality of frame housing mounted about the central support. As such, the general purpose of the present invention, which will be described subsequently in greater detail, is to provide a new and improved picture frame illumination apparatus which has all the advantages of the prior art picture frame illumination apparatus and none of the disadvantages.

To attain this, the present invention provides a picture frame formed in a perimeter relationship relative to a central support plate. The picture frame includes a housing coextensively directed about the support plate, with the housing including a housing section associated with each side of the support plate. Each housing section includes an elongate cylindrical illumination bulb mounted therewithin. A transparent lens is positioned contiguous to and adjacent each edge of the central support plate coextensive with each illumination bulb to direct illumination onto the central support plate. A modification of the invention includes each elongate bulb formed with a plurality of semi-cylindrical coatings, including an opaque, translucent, and clear coating to provide a varying degree of illumination directed upon the central support plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved picture frame illumination apparatus which has all the advantages of the prior art picture frame illumination apparatus and none of the disadvantages.

It is another object of the present invention to provide a new and improved picture frame illumination apparatus which may be easily and efficiently manufactured and marketed.

It is a further object of the present invention to provide a new and improved picture frame illumination apparatus which is of a durable and reliable construction.

An even further object of the present invention is to provide a new and improved picture frame illumination apparatus which is susceptible of a low cost of manufacture with regard to both material and labor, and which accordingly is then susceptible of low prices of sale to the consuming public, thereby making such picture frame illumination apparatus economically available to the buying public.

Still yet another object of the present invention is to provide a new and improved picture frame illumination apparatus which provides in the apparatuses and methods of the prior art some of the advantages thereof, while simultaneously overcoming some of the disadvantages normally associated therewith.

These together with other objects of the invention, along with the various features of novelty which characterize the invention. are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 3 is an orthographic view, taken along the lines 3—3 of FIG. 1 in the direction indicated by the arrows.

FIG. 4 is a diagrammatic illustration of typical circuitry utilized by the invention.

FIG. 5 is an illumination bulb utilized by a modification of the invention.

FIG. 6 is a diagrammatic end view of the various coatings about the illumination bulb, as illustrated in FIG. 5.

FIG. 7 is an isometric illustration of a modified housing utilized by the invention.

DESCRIPTION OF THE PREFERRED EMBODIMENT

Figure 8:
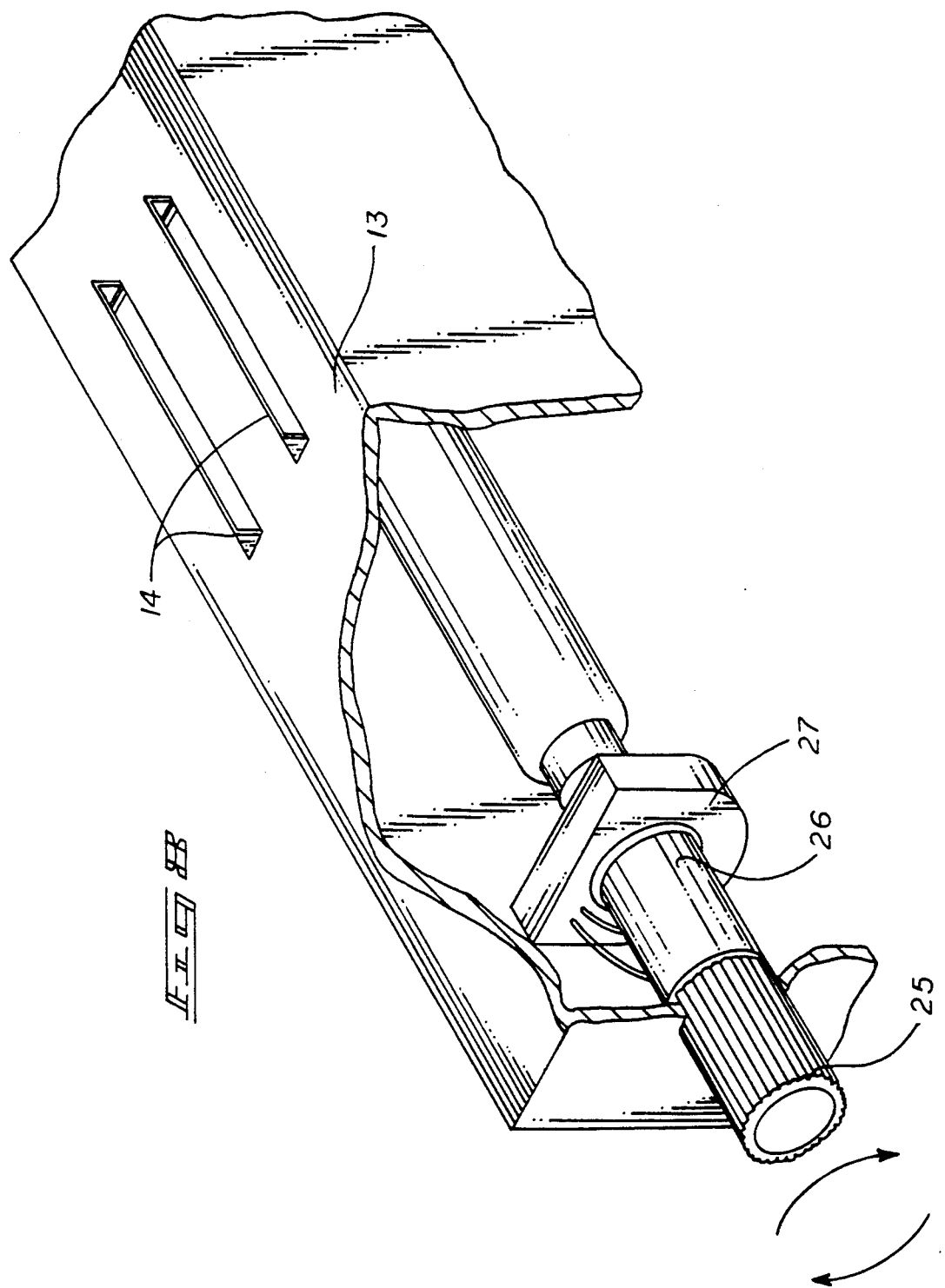
FIG. 8 is an orthographic view, taken along the lines 8—8 of FIG. 7 in the direction indicated by the arrows.

With reference now to the drawings, and in particular to FIGS. 1 to 8 thereof, a new and improved picture frame illumination apparatus embodying the principles and concepts of the present invention and generally designated by the reference numeral 10 will be described.

More specifically, the picture frame illumination apparatus 10 of the instant invention essentially comprises a multi-sided central support plate 11, with a housing 12 coextensively and continuously mounted about the periphery of the central support plate 11. The housing 12 is formed with a respective first, second, third, and fourth housing member 12a, 12b, 12c, and 12d respectively. The second housing member 12b includes a housing top plate 13 that is formed with a matrix to include a plurality of rows of vent openings 14 directed therethrough to direct heat rearwardly of the housing 12, as each of the housing members 12a-12d are in communication relative to one another to minimize heat containment within the housing 12. Each of the housing members includes a housing cavity 15, with each housing member 12a-12d including a transparent lens 16 orthogonally oriented relative to each side of the support plate 11. The transparent lenses are each coextensive relative to an illumination bulb 17 positioned rearwardly within each housing member. A battery pack 18, or selectively alternating current power supply 20, is directed through a switch 19 to provide electrical energy to each illumination bulb 17 to effect illumination of each illumination bulb and direct such illumination through each lens 16 onto a picture mounted upon the central support plate 11. A modified bulb structure 21, as illustrated in FIG. 5, that includes a plurality of coatings thereon, including a first opaque semi-cylindrical covering 22, a translucent second semi-cylindrical covering 23, and a third clear semi-cylindrical covering 24. Each covering is coextensive of the bulb and defines an arc of substantially one hundred twenty degrees about each bulb 21. Each bulb 21 is mounted upon an axle 26, with the axle 26 rotatably mounted within at least one axle support housing 27 (see FIG. 8). A rotary dial 25 is orthogonally directed exteriorly of each housing member 12a through 12d, whereupon rotation of the dial 25 effects rotation of the axle 26 and the associated bulb 21 to direct selective illumination onto the central support plate 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A picture frame illumination apparatus, comprising, a central support plate, the central support plate including a plurality of edges, the plurality of edges include a top edge, a bottom edge, a first side edge, and a second side edge, and a housing mounted fixedly to the central support plate extending forwardly thereof, with the housing mounted coextensively to each edge of the support plate, the first edge including a first housing member, the top edge including a second housing member, the second edge including a third housing member, and the bottom edge including a fourth housing member, each housing member in communication relative to an adjacent housing member, and the second housing member including a top plate, the top plate including a plurality of vent openings directed therethrough to direct heat interiorly of the housing, and each housing member including an illumination bulb mounted coextensively within each housing member, each housing member further including a transparent lens in contiguous and coextensive communication with each edge of the central support plate, whereupon illumination of each illumination bulb directs illumination onto the central support plate through each respective transparent lens, and wherein each illumination bulb is cylindrical, and wherein each illumination bulb is rotatably mounted within each respective housing member, and wherein each illumination bulb is mounted coaxially with an axle member, each axle member is rotatably mounted within a support housing, and each axle member includes a rotary dial projecting exteriorly of each housing member, whereupon rotation of the dial effects rotation of the axle and the illumination bulb, and wherein each illumination bulb includes a first opaque semi-cylindrical covering, a transparent second semi-cylindrical covering, and a third semi-cylindrical covering, and wherein each covering defines an arc of one hundred twenty degrees about each illumination bulb.

* * * * *